United States Patent [19]

Weingand

[11] 4,293,376
[45] Oct. 6, 1981

[54] METHOD OF PRODUCING PERFORATED GLASS PLATE

[75] Inventor: Kaspar Weingand, Dürnbach, Fed. Rep. of Germany

[73] Assignee: Siemens Aktiengesellschaft, Berlin & Munich, Fed. Rep. of Germany

[21] Appl. No.: 6,204

[22] Filed: Jan. 24, 1979

[30] Foreign Application Priority Data

Jan. 24, 1978 [DE] Fed. Rep. of Germany ....... 2802976

[51] Int. Cl.³ ...................... B23P 15/00; B23P 25/06; B44C 1/22; C03C 15/00
[52] U.S. Cl. ......................................... 156/644; 65/31; 156/656; 156/657; 156/659.1; 156/663; 252/79.3
[58] Field of Search ..................... 65/31; 156/644, 654, 156/655–657, 659, 660, 663, 659.1, 661.1; 252/79.1, 79.3; 430/312, 321, 323, 329

[56] References Cited

U.S. PATENT DOCUMENTS

| 2,324,087 | 7/1943 | Jelley ................................. 156/646 |
| 2,719,373 | 10/1955 | Allen et al. ...................... 156/646 X |
| 3,956,667 | 5/1976 | Veith ............................. 315/169 TV |
| 4,053,351 | 10/1977 | Deforest et al. ................ 156/663 X |
| 4,059,480 | 11/1977 | Ruh et al. ........................ 156/663 X |
| 4,127,437 | 11/1978 | Bersin et al. .................... 156/646 X |

Primary Examiner—William A. Powell
Attorney, Agent, or Firm—Hill, Van Santen, Steadman, Chiara & Simpson

[57] ABSTRACT

A perforated glass plate for use in gas discharge display devices is produced by providing an etch-resistant coating in a select pattern on surfaces of a glass plate so that areas to be perforated are coating-free, subjecting the so-coated glass plate to a gaseous hydrofluoric acid, obtained from concentrated hydrofluoric acid, for a period of time sufficient to etch fine sized perforations, for example holes, through the plate and rinsing the etched plates.

5 Claims, 2 Drawing Figures

METHOD OF PRODUCING PERFORATED GLASS PLATE

BACKGROUND OF THE INVENTION

1. Field of the Invention

The invention relates to perforated glass plates as well as to a method and apparatus for producing such plates and somewhat more particularly the invention relates to glass plates having fine sized perforations therein so as to be useful in gas display discharge devices, such as plasma display devices, particularly in such devices which have a high picture point density.

2. Prior Art

German Offenlegungsscrift No. 2,412,869 (which corresponds to U.S. Pat. No. 3,956,667 and which is incorporated herein by reference) describes a luminescent gas discharge display device. In order to produce a plasma display with this type of device, a so-called control plate is necessary for controlling the individual picture points. This control plate divides the interior space of such display devices into two realms, a plasma realm and a post-acceleration realm. Generally, the control plate comprises a perforated glass plate having a matrix-type array of metal tracks or conductor paths surrounding such perforations. In such a matrix array, electrodes or conductor path facing the plasma realm extend horizontally (line or row tracks) while the electrodes facing the post-acceleration realm extend vertically (column tracks). With such an electrode arrangement, each picture point in the display device can be individually controlled. In this manner, electrons present in the plasma realm can be controllable moved via a circuit through the perforated glass plate in the post-accelaration realm and onto the luminescent screen.

The number of perforations or holes in glass plate of the above-described type is determined by a given utility and, in plasma display devices, is determined by the number of picture points desired. For example, with present-day television line scanning patterns on a picture tube having a diagonal dimension of 67 cm, the control array comprises a horizontal grid of 0.32 mm and a vertical grid of 0.64 mm and determines the number of holes in a control plate. Since such holes or perforations must be provided by etching, control limitation in the manufacture of plates containing such holes results, since a specific relationship between the thickness of a glass plate, the hole size and the spacing of the holes must be accurately attained. In addition, since etching occurs after the desired conductor paths or tracks have been positioned on the plate surfaces, a danger exists that such tracks will either insufficiently adhere to the glass surfaces or be completely separated therefrom during the etching process because of the undercutting or underetching (lateral etching) of the glass area beneath the tracks. Accordingly, control problems exists in etching plates having predetermined geometric patterns and a solution is required which allows such etching and satisfies all of the required conditions.

SUMMARY OF THE INVENTION

The invention provides a perforated glass plate, a gas discharge display device having such glass plate therein, a process for producing such perforated glass plate and an apparatus for practicing the process for producing such plate, whereby perforated glass plates having a high hole density are reliably and simply attained and which have an exceptionally good etching factor.

In accordance with the principles of the invention, the method embodiment of the invention comprises etching a glass plate coated with an etch-resistant material in a pattern corresponding to a desired hole pattern in sealable container (etching chamber) with a gaseous hydrofluoric acid so that the etch-resist coated areas are not etched while the uncovered areas are etched to provided the desired holes. This process is substantially advantageous over prior art immersion etching or spray etching processes because a substantially more favorable etching factor, which is defined as the ratio of etched depth dimension to etched lateral dimension, is attained. In contrast to known immersion or spray etching processes, the gas etch process of the invention provides a relation between etched depth dimension and etched lateral dimension which is more favorable by at least a factor of two.

In certain method embodiments of the invention, when a metal etch-resist coating is utilized, a protective gas, such as hydrogen or nitrogen, may be provided within the etching chamber to further protect the metal etch-resist. The embodiment where copper comprises the metal etch-resist, an adhesive layer composed of titanium may be provided between the surface of the glass plate and the etch-resist coating so as to further improve the resultant etching factor. In certain method embodiments of the invention, a target mark may be provided on surfaces of the glass plates to be etch and left uncoated with the etch-resist material so that progress of the etching process can be readily observed.

In accordance with the principles of the invention, the apparatus embodiment of the invention comprises a gas-sealable and at least partially transparent hollow container having an etching chamber therein for containing a gaseous hydrofluoric acid and a means for supporting at least one glass plate within such chamber. A source of concentrated hydrofluoric acid may be provided in communication with such chamber so that only gaseous hydrofluoric acid contacts the glass plate being etched. In some embodiments of this apparatus, a gas-circulating means may be positioned within the etching chamber and a washing means, such as a sluic, may be provided in communication with the etching chamber. In some embodiments of this apparatus, a source of concentrated hydrofluoric acid may be included a controllable heating means for heating the concentrated acid and such source may comprise a separate container in communication with the etching chamber. In some embodiments of this apparatus, the source of concentrated hydrofluoric acid may include a spray means for spraying such acid within the source so as to increase and attain a constant vapor pressure in the etching chamber while avoiding spraying of liquid acid on glass plates therein.

In accordance with the principles of the invention, the perforated glass plates of the invention are incorporated in a gas discharge or plasma display device as actual control plates or as spreaders between a control plate and luminescent screen thereof. In certain embodiments of such display devices, a plurality of such perforated glass plates are positioned, one on top of the other, to fill-out the space between the control plate and luminescent screen of the display device. In some embodiments of such display devices, the perforated glass plates have a titanium layer on all surfaces thereof except those which contact the control plate of the device.

BRIEF DESCRIPTION OF THE DRAWINGS

Other objects, features, embodiments and advantages of the invention will be readily apparent from the following description of certain preferred embodiments thereof, taken in conjunction with the accompanying drawing which, by way of illustration, show a preferred embodiment of the present invention and the principles thereof and what is now considered to be the best mode contemplated for applying these principles. Other embodiments of the invention, embodying the same or equivalent principles may be used and structural or other changes may be made as desired by those skilled in the art without departing from the spirit and scope of the novel concepts of the invention, and in which.

DESRIPTION OF THE PREFERRED EMBODIMENT

Figure 1:
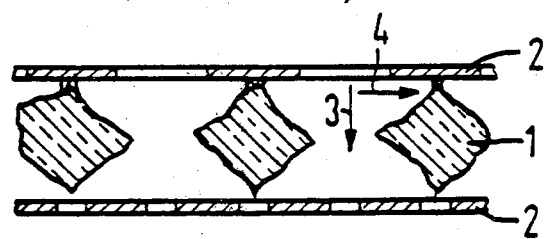
FIG. 1 is a partial elevated and enlarged cross-sectional and somewhat diagrammatic view of a perforated glass plate produced via a prior art immersion process.

The invention provides a perforated glass plate having a relatively high perforation density, with such perforations having a relatively high etching factor, a method of producing such perforated plates, an apparatus for practicing such method and gas discharge display devices incorporating such perforated plates therein.

In accordance with the principles of the invention, a glass plate of any select size is positioned in a gas-sealable container having an etching chamber therein so that only gaseous hydrofluoric acid contacts select areas of such glass plate, which correspond to those areas whereat perforations are desired. The glass plate may be coated with a select pattern of a layer of an etch-resist material, such as a metal or the like, to facilitate perforating select areas of such plate. A material advantage of such gas phase etching process is that the resultant perforations have an etching factor which is significantly higher and substantially more favorable than that obtained via prior-art immersion etching or spraying etching (i.e., where the glass plate is immersed in a liquid etchant or sprayed with a liquid etchant). An "etching factor", as utilized herein, is defined as the ratio between an etching depth dimension and an etched lateral dimension in a given perforation or group of perforations.

In contrast to known immersion etching or spray etching (as defined above), the relation of an etched depth dimension to an etched lateral dimension obtained in the practice of the invention is more favorable by a factor of at least 2. If for example, with known liquid etching process, a control plate having a hole grid dimension of 0.32 mm or 0.64 mm respectively, and an individual hole size of about 0.2 mm×0.5 mm can be produced from a glass pate which is 0.1 mm thick, then with the gas etching process of the invention, the identical hole grid dimension and hole sizes can be produced from a glass pate which is 0.2 mm thick. With the novel etching process of the invention, perforated plates are produced which are substantially stronger and can readily brace or support control plates in the display devices, as required.

In instances where a metal, for example copper, is utilized as an etch-resistant material to define a select hole pattern on a glass plate, it is preferable to apply an adhesive layer of titanium between the glass surface and the copper layer in order to further reduce the amount of undercutting (i.e., lateral etching) that may occurs beneath the etch-resist coated areas. During etching of holes in glass plates, hydrogen is generated by the reaction of hydrofluoric acid and titanium and generally adheres to the vertical glass surfaces of the resultant holes and displaces hydrofluoric acid therefrom so as to reduce the amount of lateral etching. In contrast, during immersion etching or spray etching with a liquid etchant, this effect does not occur because the etching reaction products are removed too quickly to build-up a barrier against the attaching hydrofluoric acid.

With the gas etching process of the invention, there is no longer any substantially danger of completely etching away glass areas which are to remain, (i.e., no danger of destroying land areas between the individual holes). Further, with the gas etching process of the invention, a more uniform etching reliably takes place so that large-surface plates can be uniformal etched. Further, such gas etching process can be practice with substantially simpler apparatus, in contrast to immersion or spray etching processes and requires less washing or rinse solution. In comparison to conventional immersion etching processes, problems caused by contaminations do not occur with the gas etching process of the invention and the danger of breakage is significantly reduced.

The apparatus for practicing the gas etching process of the invention is relatively simple and comprises a closeable hollow container having at least one completely or partially transparent wall providing a view of an etching chamber therein and means for supporting one or more glass plates within such reaction chamber. Such container is in communication with a source of concentrated hydrofluoric acid so that only gaseous hydrofluoric acid contacts glass plates within the etching chamber. With this type of device, etchant losses via removal of the work-pieces (i.e. glass plates), which invariably occur in immersion and spray etching processes, are substantially completely avoided. Further, the etch-resist material, which may be a metal, a photo-resist, etc., is more constant or effective with a vapor or gas phase etchant. Yet further, the progress of the etching process can be readily observed via the fully or partially transparent wall.

In an exemplary embodiment of the invention, the abovedescribed apparatus may be provided with a washing means, such as a sluice, such that etched plates can be immediately washed or rinsed after the etching process without removal from the etching apparatus. With such embodiment, an endangerment of the surrounding area by gaseous hydrofluoric acid is avoided. In another exemplary embodiment, a gas-circulating means, such as a fan, may be provided within the etching chamber to homogenize or otherwise mix the gas therein. In this manner, more gaseous etchant is always present than is used up by the etchant process and there is always an excess of gaseous hydrofluoric acid available.

In order to accelerate the gas etching process, the concentrated hydrofluoric acid may be heated. Apparatus embodiments which include this feature can process a larger number of work-pieces in a single etch process and allow a higher density of glass plates to be positioned within the etch chamber.

In a preferred embodiment of the invention, the concentrated hydrofluoric acid is stored in a separate container which is in communication with the etching chamber so that gaseous hydrofluoric acid can be controllably delivered to the etching chamber. This embodiment enables an easier working procedure since the etching chamber can be isolated from the source of hydrofluoric acid and the gaseous hydrofluoric acid can be removed from the etching chamber before removal of the etched glass plates therefrom. Further, this embodiment enables removal of gaseous reaction products from the etching chamber so that no dilution of the hydrofluoric gas occurs.

In another preferred embodiment, the concentrated hydrofluoric acid is sprayed or atomized within its container or source so as to increase and attain a relatively constant vapor pressure of gaseous hydrofluoric acid in the etching chamber without, however, spraying liquid hydrofluoric acid onto the glass plates being etched. This embodiment allow a particularly economical process sequence to be attained and allows removal of any gaseous reaction products from the reaction chamber in order to prevent dilution of the hydrofluoric gas therein.

In certain embodiments of the invention, means are provided for removing reaction products from the etched glass plates. In producing fine size holes, solid reaction products may remain within the etched holes and such must be removed, for example, by intense rinsing with plain water, a mixture of water and a surfaceactive agent, sulfuric acid or someother suitable washing liquid, with or without auxiliary means, such as a supersonic energy producing means.

The process of the invention may, of course, be utilized to etch other defined structures, in glass plates for example a bar pattern, if desired.

Figure 2:
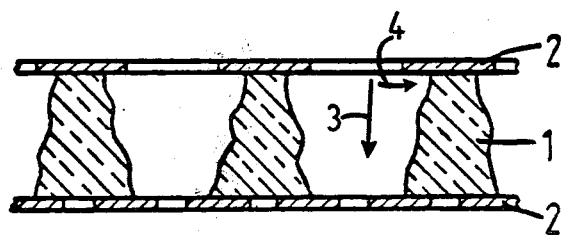
FIG. 2 is a somewhat similar view of a preforated glass plate produced in accordance with the principles of the invention.

Referring now to FIGS. 1 and 2, wherein like reference numerals refer to like elements or portions, a glass plate 1 is shown having an etch-resist coating 2 on opposite surfaces thereof. FIG. 1 illustrates a glass plate after a wet-etching process and, as can be seen, the relation between the etched depth dimension (schematically indicated via arrow 3) and the etched lateral dimension (schematically indicated by arrow 4) is quite unfavorable so that such plate is relatively weak and relatively small glass areas remain between the respective holes. FIG. 2, in contrast, illustrates a glass plate after it has been gas etched in accordance with the principles of the invention and, as can be seen, such plate exhibits a very favorable etching factor. Further, as can be seen from FIG. 1, the resist coating 2 has been undercut to such a degree that it lifts off and no longer adheres to the glass surface.

With the foregoing general discussion in mind, there is now presented detailed exemplary examples that will illustrate to those skilled in the art the manner in which the invention is carried out. However, these examples are not to be construed as limiting the scope of the invention in any way.

EXAMPLE I

A glass plate of 0.2 mm thickness is metallized on both sides thereof (i.e., on the major surfaces thereof) with a 30 nm thick layer of titanium and a 300 nm thick layer of copper. A layer of a photo-resist is then provided on the copper surfaces so as to correspond to the negative image of a desired track or conductor array via conventional technology. The metal surfaces not covered with photo-resist are galvantically reinforced (i.e., electro-plated) with a 5 $\mu$m thick layer of copper and a 1 $\mu$m thick layer of nickel. Thereafter, the photo-resist layer is photographically removed (i.e., exposed and washed with a suitable solvent) at those regions where holes are to be etched and the underlying areas of metal (copper and titanium) are etched away to uncover the glass surface at those regions as well as at another select region of the glass plate so that a target or test mark can be placed on the so-covered surface for monitoring the subsequent etching process. The electrode grid pattern applied via the photo-resist is 0.32 mm×0.64 mm, with a hole size of about 0.16 mm×0.4 mm. The so-prepared glass plate is then positioned within a gas-sealable container having an etching chamber therein and at least one transparent wall. The etching chamber includes a support tray for receiving and supporting the glass plate in such a manner that the opposite surfaces thereof, i.e., the surfaces to be etched, are not covered or masked by the support surfaces. A gaseous hydrofluoric acid obtained from a source containing 75% hydrofluoric acid at atmospheric pressure is fed into the etching chamber so as to contact the glass plate therein. The etching process takes about 15 to 20 minutes, depending upon the desired degree of etching. During the etching process, the hydrofluoric acid gas pressure is maintained as constant as possible by a gas-circulating means and a heating means. During the etching reaction, the progress thereof is monitored via the target mark viewed through the transparent etching chamber wall. After the etching is completed, the etched glass plate is briefly rinsed. Etching reaction produces, such as calcium fluoride, alkali hexafluorosilicates, etc., remain in at least some of the etched holes and are practically rinsed away with water having a surface-active or wetting agent therein, or may be dissolved away with sulfuric acid. Thereafter, the remaining photo-resist layer is removed and the metal layer (titanium and copper) remaining between the galvantically reinforced tracks or conductor paths is removed by etching so as to produce an insulating area between the respective tracks. The resultant metallic tracks have adequate adhesion to the underlying glass surface and the resulting perforated plate is useful as a control plate in a plasma display device.

EXAMPLE 2

A plurality of glass plates, each having a thickness of 0.3 mm, are metalized on both sides thereof with a 100 nm thick layer of titanium and a 1000 nm thick layer of copper. Thereafter, via conventional photo-resist technology, an electrode array having grid dimensions of 0.32 mm and 0.64 mm respectfully as well as surfaces areas of about 0.1 mm×0.3 mm are etched free of the metal (copper and titanium) cladding on each plate. The so-prepared glass plates are then brought into contact for about 25 minutes with a gas phase of a 75% hydrofluoric acid maintained at room temperature and atmospheric pressure. After etching and thoroughly rinsing, the remaining photo-resist layer is dissolved and the remaining copper layer is etched away. Any solid etching reaction products remaining in the holes etched through the glass plate are readily removed in about one minute via water with the aid of supersonic energy. The resultant glass plates may be utilized as spreaders or spacing members between a control plate and a luminescent screen in a plasma display device. Accordingly, it is not necessary to etch away the remaining titanium layer on all such plates. The titanium layer need only be removed from the perforated plate which actually comes into direct contact with the control plate of a display device. With the selected etching time of 25 minutes, the holes in the glass plates in the foregoing process are clearly larger than 0.1 mm×0.3 mm (the size of the uncovered glass surface areas which were etched), however, the perforated glass support structure that remains is of adequate strength so that a plurality of such glass plates may be positioned one on top of the other to fill-out the space between a control plate and a luminescent screen in a plasma display devices. Of course, the glass plate which comes into direct contact with the control plate has it remaining titanium layer removed therefrom.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalence may be resored to, falling within the scope of the invention as claimed.

What I claim as my invention:

1. A process for etching relatively fine size perforations in glass plates, comprising:
    coating opposite surfaces of glass plates with a select pattern composed of a hydrofluoric acid-resistant metal so that glass surface areas corresponding to desired locations of perforations are free of said resist metal; and
    etching perforations having an average depth dimension which is greater by a factor of at least two relative to the average lateral dimension thereof through the glass surface areas free of said resist metal by contacting said coated glass plates with a gas having hydrofluoric acid therein for a period of time sufficient to etch said perforations.

2. A process as defined in claim 1 wherein said coated glass plates are contacted with a gas composed of a mixture of hydrofluoric acid and a protective gas selected from the group consisting of hydrogen and nitrogen.

3. A process as defined in claim 1 wherein a target mark is placed on a surface area of each of said glass plates and such target mark is not covered with said resist material.

4. A process for etching relatively fine size perforations in a glass plate, comprising
    coating opposite surfaces of glass plates with a select pattern composed of a hydrofluoric acid-resistant material so that glass surface areas corresponding to desired locations of perforations are free of said resist material, the outer surface of said resist material being composed of a metal and an inner layer of said resist material being composed of an adhesive layer composed of titanium provided between the surface of said glass plate and said resist material; and
    etching perforations having an average depth dimension which is greater by a factor of at least two relative to the average lateral dimension thereof through the glass surface areas free of said resist material by contacting said coated glass plates with a gas having hydrofluoric acid therein for a period of time sufficient to etch said perforations.

5. A process as defined in claim 4 wherein said metal is copper.

* * * * *